(12) United States Patent
Lewandowski et al.

(10) Patent No.: US 9,399,724 B2
(45) Date of Patent: Jul. 26, 2016

(54) PRESSURE-SENSITIVE ADHESIVES WITH (METH)ACRYLIC-BASED ELASTOMERIC MATERIALS PREPARED USING (2-ISOPROPYL-5-METHYL)HEXYL (METH)ACRYLATE

(75) Inventors: Kevin M. Lewandowski, Inver Grove Heights, MN (US); Jason D. Clapper, Lino Lakes, MN (US); Terence D. Spawn, Stillwater, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 93 days.

(21) Appl. No.: 14/345,060

(22) PCT Filed: Sep. 12, 2012

(86) PCT No.: PCT/US2012/054836
§ 371 (c)(1),
(2), (4) Date: Mar. 14, 2014

(87) PCT Pub. No.: WO2013/048735
PCT Pub. Date: Apr. 4, 2013

(65) Prior Publication Data
US 2014/0370281 A1    Dec. 18, 2014

Related U.S. Application Data

(60) Provisional application No. 61/538,996, filed on Sep. 26, 2011.

(51) Int. Cl.
*C09J 133/08* (2006.01)
*C08F 120/18* (2006.01)
*C08F 220/18* (2006.01)

(52) U.S. Cl.
CPC .............. *C09J 133/08* (2013.01); *C08F 120/18* (2013.01); *C08F 220/18* (2013.01); *C08F 2220/1875* (2013.01); *Y10T 428/2891* (2015.01)

(58) Field of Classification Search
CPC ..... C09J 133/08; C09J 133/10; C08F 220/18; C08F 2220/1875
See application file for complete search history.

(56) References Cited

U.S. PATENT DOCUMENTS

| | | | |
|---|---|---|---|
| 3,558,716 A | 1/1971 | Engelhardt | |
| 4,547,586 A | 10/1985 | Suzukamo | |
| 5,648,425 A | 7/1997 | Everaerts | |
| 6,777,079 B2 | 8/2004 | Zhou | |
| 7,385,020 B2 | 6/2008 | Anderson | |
| 7,893,179 B2 | 2/2011 | Anderson | |
| 8,137,807 B2 | 3/2012 | Clapper | |
| 8,318,970 B2 * | 11/2012 | Meisenburg | C07C 67/08 560/129 |
| 2004/0229990 A1 * | 11/2004 | Righettini | C09D 4/06 524/445 |
| 2009/0270003 A1 | 10/2009 | Anderson | |
| 2009/0270577 A1 | 10/2009 | Beyers | |
| 2009/0270658 A1 | 10/2009 | Babler | |
| 2010/0317887 A1 | 12/2010 | Meisenburg | |
| 2011/0104486 A1 | 5/2011 | Ma | |

FOREIGN PATENT DOCUMENTS

| | | | |
|---|---|---|---|
| EP | 02072594 | 6/2009 | |
| JP | 63-250347 | 10/1988 | |
| JP | 2005-307082 | 11/2005 | |
| WO | WO 02/44296 | 6/2002 | |
| WO | WO 2009106550 A1 * | 9/2009 | ............. C07C 67/08 |

OTHER PUBLICATIONS

Full Translation of JP 63-250347A (1988).*
Gregorio, "Condensation of Alcohols Catalysed by Tertiary Phosphine Transition Metal Complexes", Journal of Organometallic Chemistry, 1972, vol. 37, pp. 385-387.
Matsu-Ura, "Guerbet Reaction of Primary Alcohols Leading to β-Alkylated Dimer Alcohols Catalyzed by Iridium Complexes", Journal of Organic Chemistry, 2006, vol. 71, No. 21, pp. 8306-8308.
O'Lenick, Jr., "Guerbet Chemistry", Journal of Surfactants and Detergents, Jul. 2001, vol. 4, No. 3, pp. 311-315.
Zada, "A convenient resolution of racemic lavandulol through lipase-catalyzed acylation with succinic anhydride: simple preparation of enantiomerically pure (R)-lavandulol", Tetrahedron: Asymmetry, Jan. 2006, vol. 17, No. 2, pp. 230-233.
International Search Report for PCT/US2012/054836, 3 pages.

* cited by examiner

*Primary Examiner* — Scott R Walshon
(74) *Attorney, Agent, or Firm* — Jean A. Lown

(57) ABSTRACT

Pressure-sensitive adhesive compositions and articles containing the pressure-sensitive adhesives are provided. The pressure-sensitive adhesives contain an (meth)acrylic-based elastomeric material prepared from (2-isopropyl-5-methyl) hexyl (meth)acrylate.

15 Claims, No Drawings

PRESSURE-SENSITIVE ADHESIVES WITH (METH)ACRYLIC-BASED ELASTOMERIC MATERIALS PREPARED USING (2-ISOPROPYL-5-METHYL)HEXYL (METH)ACRYLATE

CROSS REFERENCE TO RELATED APPLICATIONS

This application is a national stage filing under 35 U.S.C. 371 of PCT/US2012/054836, filed Sep. 12, 2012, which claims priority to U.S. Application No. 61/538,996, filed Sep. 26, 2011, the disclosure of which is incorporated by reference in its/their entirety herein.

FIELD

Pressure-sensitive adhesives are provided that include (meth)acrylic-based elastomeric materials prepared using (2-isopropyl-5-methyl)hexyl (meth)acrylate.

BACKGROUND

Pressure-sensitive adhesives are adhesives with specific characteristics such as aggressive and permanent tack, adherence with no more than finger pressure, sufficient ability to hold onto an adherend, and sufficient cohesive strength to be removed cleanly from the adherend. As applications for pressure-sensitive adhesives have increased substantially in recent years, performance requirements have become more demanding.

While a variety of natural and synthetic elastomeric materials have been included in pressure-sensitive adhesives, the use of (meth)acrylic-based elastomeric material is widespread due to a number of beneficial properties. In addition to providing the desired degree of adhesion and cohesion, (meth)acrylic-based elastomeric materials often can be tailored to provide other desirable characteristics such as elasticity, tackiness, transparency, resistance to light and oxidation, and the like. (Meth)acrylic-based elastomeric materials have been described, for example, in the following patent references: EP Patent Application 2072594 A1 (Kondou et al.), U.S. Pat. No. 5,648,425 (Everaerts et al.), U.S. Pat. No. 6,777,079 B2 (Zhou et al.), and U.S. Patent Application Publication 2011/04486 A1 (Ma et al.).

(Meth)acrylic-based elastomeric materials used in pressure-sensitive adhesive compositions are typically derived from petroleum feedstocks. Higher oil prices have led to volatile supplies of (meth)acrylic-based elastomeric materials and/or monomers used to prepare the (meth)acrylic-based elastomeric materials. It is desirable to replace all or part of the petroleum-based feedstocks with those derived from renewable sources such as plants. The replacement of petroleum-based materials with plant-based materials can be both economically and socially beneficial.

SUMMARY

A pressure-sensitive adhesive composition is provided that includes a (meth)acrylic-based elastomeric material prepared from polymerizable material that includes a branched alkyl (meth)acrylate with the alkyl group having 10 carbon atoms. More specifically, the alkyl (meth)acrylate is (2-isopropyl-5-methyl)hexyl (meth)acrylate, which can be a plant-based monomer. The pressure-sensitive adhesive typically has characteristics suitable for applications where repositionability and/or clean removal from the adherend is considered desirable.

In one aspect, a pressure-sensitive adhesive composition is provided that includes a (meth)acrylic-based elastomeric material. The (meth)acrylic-based elastomeric material contains a reaction product of polymerizable material that includes (a) a first monomer that is (2-isopropyl-5-methyl)hexyl (meth)acrylate in an amount equal to at least 10 weight percent based on a total weight of the polymerizable material and (b) a second monomer having an ethylenically unsaturated group.

In a second aspect, an article is provided that includes (a) a pressure-sensitive adhesive composition as described above and (b) a substrate adhered to the pressure-sensitive adhesive composition.

DETAILED DESCRIPTION

Pressure-sensitive adhesive (PSA) compositions and articles containing these compositions are provided. The pressure-sensitive adhesive compositions contain a (meth)acrylic-based elastomeric material prepared using polymerizable material that includes (a) (2-isopropyl-5-methyl)hexyl (meth)acrylate and (b) at least one other ethylenically unsaturated monomer. The (2-isopropyl-5-methyl)hexyl (meth)acrylate can be prepared from plant-based rather than petroleum-based feedstocks.

As used herein, the term "(meth)acrylate" refers to an acrylate, methacrylate, or both. The term "(meth)acrylic" refers to methacrylic, acrylic, or both. A "(meth)acrylic-based" material refers to one prepared using at least one monomer having a (meth)acryloyl group, which is a group of formula $CH_2=C(R^1)-(CO)-$ where $R^1$ is hydrogen or methyl. The term "(meth)acrylate ester" refers a monomer of formula $CH_2=C(R^1)-(CO)-OR^2$ where $R^2$ is an alkyl, heteroalkyl, alkenyl, or aryl. An alkyl, heteroalkyl, or alkenyl $R^2$ group can be substituted with an aryl, aryloxy, halo, or a combination thereof. An aryl $R^2$ group can be substituted with an alkyl, heteroalkyl, halo, alkoxy, aryloxy, or a combination thereof. The term "alkyl (meth)acrylate" or "alkyl (meth)acrylate ester" refers to a (meth)acrylate ester where $R^2$ is an alkyl group.

(Meth)acrylic-based elastomeric materials included in known pressure-sensitive adhesives are often prepared from one or more non-polar (meth)acrylate monomers with a relatively low glass transition temperature ($T_g$). The $T_g$ of a monomer is usually measured as a homopolymer prepared from the monomer. The one or more non-polar (meth)acrylate monomers are often combined with various optional monomers such as one or more polar monomers. The polar monomers are often selected to have an acidic group, a hydroxyl group, or a nitrogen-containing group.

Some widely used non-polar (meth)acrylate monomers in conventional (meth)acrylic-based elastomeric materials are alkyl (meth)acrylates such as 2-ethylhexyl acrylate (EHA) and isooctyl acrylate (IOA). Both of these alkyl acrylates have an alkyl group with eight carbon atoms (i.e., the monomers are $C_8$ alkyl acrylates). Alkyl (meth)acrylates having alkyl groups with more than eight carbon atoms can have a number of disadvantages in terms of pressure-sensitive adhesive performance. For example, alkyl (meth)acrylates with longer alkyl chains such as longer linear alkyl chains (e.g., lauryl acrylate, which is a $C_{12}$ alkyl acrylate), can lead to crystalline groups within the polymer. The presence of these crystalline groups can significantly reduce the tackiness of the elastomeric material and the adhesion performance of the formulated pressure-sensitive adhesive composition.

If the crystallization temperature ($T_c$) can be suppressed, alkyl (meth)acrylates having alkyl groups with a greater number of carbon atoms can be beneficial over conventional $C_8$ alkyl (meth)acrylates. Elastomeric materials are provided that are formed using a branched $C_{10}$ alkyl (meth)acrylate. More specifically, the branched $C_{10}$ alkyl (meth)acrylate is (2-isopropyl-5-methyl)hexyl (meth)acrylate. These (meth)acrylic-based elastomeric materials can have a higher plateau storage modulus and improved cohesive strength compared to $C_8$ alkyl (meth)acrylates and to other previously used $C_{10}$ alkyl (meth)acrylates such as (meth)acrylate esters of dihydrocitronellol and 2-propylheptanol.

In a first aspect, a pressure-sensitive adhesive composition is provided that includes a (meth)acrylic-based elastomeric material. The elastomeric material is a copolymer and is the reaction product of polymerizable material that includes (a) a first monomer that is (2-isopropyl-5-methyl)hexyl (meth)acrylate in an amount equal to at least 10 weight percent based on a total weight of the polymerizable material and (b) a second monomer having an ethylenically unsaturated group. The structure of this first monomer is shown below where $R^1$ is hydrogen or methyl.

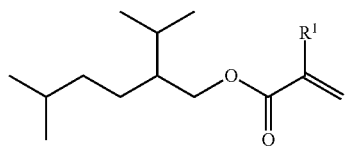

In many embodiments, the first monomer is (2-isopropyl-5-methyl)hexyl acrylate where $R^1$ is hydrogen.

The (2-isopropyl-5-methy)hexyl (meth)acrylate can be a plant-based material. In contrast, the two most commonly used $C_8$ alkyl acrylates (i.e., isooctyl acrylate and 2-ethylhexyl acrylate) are petroleum-based monomers. The (2-isopropyl-5-methy)hexyl (meth)acrylate monomer is typically formed by an esterification reaction of (2-isopropyl-5-methyl)hexanol with (meth)acrylic acid. The alcohol (2-isopropyl-5-methyl)hexanol can be prepared, for example, from lavender oil or fusel oil.

Lavender oil contains the terpene lavandulol. This terpene can be hydrogenated to form tetrahydrolavandulol, which is (2-isopropyl-5-methyl)hexanol. Tetrahydrolavandulol has the scent of roses and has been used in various fragrances and perfumes. The hydrogenation reaction is described, for example, in U.S. Pat. No. 4,547,586 (Suzukamo et al.) and U.S. Patent Application Publication 2009/0270658 A1 (Babler).

Alternatively, (2-isopropyl-5-methyl)hexanol can be prepared from fusel oil, which is often referred to as fusel alcohol. Fusel oil contains a mixture of alcohols having 2 to 5 carbon atoms that are formed during ethanol fermentation. The major component (e.g., typically 70 to 80 weight percent of all alcohols present) of fusel oil is 3-methyl-1-butanol. The remaining 20 to 30 weight percent of the alcohols are often a mixture of ethanol, 1-propanol, 2-methy-1-propanol, 1-butanol, and 2-methyl-1-butanol.

The fusel oil or a more purified form (i.e., fusel oil with a higher concentration of 3-methyl-1-butanol) can be subjected to a Guerbet reaction. The Guerbet reaction of a primary alcohol results in the formation of a β-branched primary alcohol having twice the number of carbon atoms as the reactant. The Guerbet reaction is further described, for example, in the article Matus-ura et al., *J. Org. Chem.*, 71, 8306 (2006), in the article Gregorio et al., *J. Organometal. Chem.*, 37, 385 (1972), and in the article O'Lenick, Jr., *J. Surfactants and Detergents*, 4(3), 311 (2001). Still further references describing the Guerbet reaction include U.S. Pat. No. 3,558,716 (Engelhart et al.).

When 3-methyl-1-butanol is subjected to the Guerbet reaction, the product is (2-isopropyl-5-methyl)hexanol. If the fusel oil is used without purification as a source of 3-methyl-1-butanol, the product includes minor amounts of other alcohols such as 1-butanol (from ethanol in the fusel oil), 2-ethyl-1-hexanol (from 1-butanol that was in the fusel oil feedstock or that was formed from ethanol in the fusel oil feedstock), 2-methyl-1-propanol (component of fusel oil that is not reactive because of the methyl substitution at the 2-position), and 2-methyl-1-butanol (component of fusel oil that is not reactive because of the methyl substitution at the 2-position). This product mixture can be distilled, if desired, to obtain a purified $C_{10}$ alcohol. Alternatively or additionally, the fusel oil reactant can be distilled to obtain a feedstock having a higher purity of 3-methyl-1-butanol. When this purified feedstock is subjected to the Guerbet reaction, the product mixture contains a higher concentration of the desired (2-isopropyl-5-methyl)hexanol.

The esterification reaction of alcohols such as (2-isopropyl-5-methyl)hexanol with (meth)acrylic acid is further described, for example, in references such as JP 63250347 (Shigenao et al.) and U.S. Patent Application Publication 2010/0317887 A1 (Meisenburg et al.). If desired, the esterified product (i.e., the alkyl (meth)acrylate) can be distilled under reduced pressure to remove impurities and to increase the concentration of (2-isopropyl-5-methyl)hexyl (meth)acrylate. The distillation of the alkyl (meth)acrylate can be used either instead of or in combination with distillation of the fusel oil feedstock used in the Guerbet reaction, with distillation of the alcohol formed in the Guerbet reaction, or with both. The purified product is colorless.

In some embodiments, the (meth)acrylic acid can also be plant-based material rather than petroleum-based material. For example, glycerol derived from hydrolysis of soybean oil or other triglyceride oils can be converted into (meth)acrylic acid. Alternatively, glucose can be produced by the enzymatic hydrolysis of corn starch to form lactic acid. The lactic acid can then be dehydrated to (meth)acrylic acid. In still another process, glucose can be bio-fermented to 3-hydroxypropionic acid as an intermediate. This intermediate can be dehydrated to form (meth)acrylic acid. All of these processes are further described in U.S. Patent Application 2009/0270003 A1 (Anderson et al.).

The polymerizable material used to form the copolymeric (meth)acrylic-based elastomeric material includes at least 10 weight percent (2-isopropyl-5-methyl)hexyl (meth)acrylate based on a total weight of polymerizable materials. For example, the polymerizable material can include at least 20 weight percent, at least 30 weight percent, at least 40 weight percent, at least 50 weight percent, at least 60 weight percent, at least 70 weight percent, at least 80 weight percent, at least 90 weight percent, or at least 95 weight percent of the (2-isopropyl-5-methyl)hexyl (meth)acrylate. In some embodiments, (2-isopropyl-5-methyl)hexyl (meth)acrylate is present in an amount in a range of 10 to 99.5 weight percent, 20 to 99 weight percent, 30 to 99 weight percent, 40 to 99 weight percent, 50 to 99 weight percent, 60 to 99 weight percent, 60 to 95 weight percent, 70 to 99 weight percent, 70 to 95 weight percent, 80 to 99 weight percent, 80 to 95 weight percent, 85 to 99 weight percent, or 85 to 95 weight percent based on the total weight of polymerizable material used to form the elastomeric material.

The (meth)acrylic-based elastomeric material included in the pressure-sensitive adhesive composition is a copolymer prepared from (a) the first monomer that is (2-isopropyl-5-methyl)hexyl (meth)acrylate and (b) a second monomer having at least one ethylenically unsaturated group. Any suitable second monomer with an ethylenically unsaturated group can be used in combination with (2-isopropyl-5-methyl)hexyl (meth)acrylate to prepare the (meth)acrylic-based elastomeric material. Suitable second monomers include, but are not limited to, various non-polar (meth)acrylate esters that are not (2-isopropyl-5-methyl)hexyl (meth)acrylate, various other non-polar monomers such as various non-polar vinyl monomers without a (meth)acryloyl group, various polar monomers, various crosslinkers with at least two polymerizable groups (i.e., ethylenically unsaturated groups), or a combination thereof. With the exception of crosslinkers, the second monomer typically has a single ethylenically unsaturated group.

Any suitable non-polar (meth)acrylate ester can be used as the second monomer. Examples include, but are not limited to, alkyl (meth)acrylates, alkenyl (meth)acrylates, aryl (meth)acrylates, aryl substituted alkyl (meth)acrylates, aryloxy substituted alkyl (meth)acrylates, and the like.

Alkyl (meth)acrylates include, but are not limited to, methyl (meth)acrylate, ethyl (meth)acrylate, n-propyl (meth)acrylate, isopropyl (meth)acrylate, n-butyl (meth)acrylate, isobutyl (meth)acrylate, n-pentyl (meth)acrylate, isopentyl (meth)acrylate (i.e., isoamyl (meth)acrylate), 3-pentyl (meth)acrylate, 2-methyl-1-butyl (meth)acrylate, 3-methyl-1-butyl (meth)acrylate, n-hexyl (meth)acrylate, isohexyl (meth)acrylate, 2-methyl-1-pentyl (meth)acrylate, 3-methyl-1-pentyl (meth)acrylate, 4-methyl-2-pentyl (meth)acrylate, 2-ethyl-1-butyl (meth)acrylate, 2-methyl-1-hexyl (meth)acrylate, 3,5,5-trimethyl-1-hexyl (meth)acrylate, cyclohexyl (meth)acrylate, 3-heptyl (meth)acrylate, n-octyl (meth)acrylate, isooctyl (meth)acrylate, 2-octyl (meth)acrylate, 2-ethyl-1-hexyl (meth)acrylate, n-decyl (meth)acrylate, isodecyl (meth)acrylate, 2-propylheptyl (meth)acrylate, isononyl (meth)acrylate, n-dodecyl (meth)acrylate (i.e., lauryl (meth)acrylate), n-tridecyl (meth)acrylate, isotridecyl (meth)acrylate, 3,7-dimethyl-octyl (meth)acrylate, 1-octadecyl (meth)acrylate, 17-methyl-1-heptadecyl (meth)acrylate, 1-tetradecyl (meth) acrylate, and the like.

Still other suitable non-polar (meth)acrylate esters are aryl (meth)acrylates such as, for example, phenyl (meth)acrylate or benzyl (meth)acrylate; alkenyl (meth)acrylates such as, for example, 3,7-dimethyl-6-octenyl-1 (meth)acrylate and allyl (meth)acrylate; and aryl substituted alkyl (meth)acrylates or aryloxy substituted alkyl (meth)acrylates such as, for example, 2-biphenylhexyl (meth)acrylate, benzyl (meth) acrylate, and 2-phenoxy ethyl (meth)acrylate.

In some embodiments, it is desirable for the second monomer to have a relatively high $T_g$ when formed into a homopolymer (i.e., a polymer prepared using a single polymerizable material). These monomers can be added to modulate the $T_g$ of the elastomeric material to provide enhanced adhesive strength. When polymerized by itself, these second monomers often have a $T_g$ equal to at least 25° C., at least 30° C., at least 40° C., or at least 50° C. Suitable high $T_g$ monomers include, but are not limited to, methyl methacrylate, tert-butyl methacrylate, ethyl methacrylate, n-propyl methacrylate, isopropyl methacrylate, isobutyl methacrylate, tert-butyl methacrylate, stearyl methacrylate, phenyl methacrylate, cyclohexyl methacrylate, isobornyl (meth)acrylate, benzyl methacrylate, 3,3,5-trimethylcyclohexyl acrylate, cyclohexyl methacrylate, or combinations thereof.

If present, any of the non-polar (meth)acrylate esters can be present in any suitable amount. Such monomers can be present in amounts up to 60 weight percent based on a total weight of polymerizable material used to form the (meth) acrylic-based elastomeric material. The amount can be up to 50 weight percent, up to 40 weight percent, up to 30 weight percent, up to 20 weight percent, or up to 10 weight percent. For example, this monomer can be present in an amount in a range of 0 to 60 weight percent, 1 to 60 weight percent, 0 to 50 weight percent, 1 to 50 weight percent, 0 to 40 weight percent, 1 to 40 weight percent, 0 to 30 weight percent, 1 to 30 weight percent, 5 to 30 weight percent, 10 to 30 weight percent, 0 to 20 weight percent, 1 to 20 weight percent, 5 to 20 weight percent, 10 to 20 weight percent, 0 to 10 weight percent, 1 to 10 percent, or 5 to 10 weight percent.

The second monomer can include a monomer with an acidic group and a single ethylenically unsaturated group (i.e., an acidic monomer). These monomers are typically polar. The ethylenically unsaturated group can be a (meth) acryloyl group or a vinyl group (i.e., $CH_2=CH_2-$ group) that is not a (meth)acryloyl group. Exemplary acidic monomers can have a carboxylic acid group, sulfonic acid group, phosphonic acid group, or salts thereof. Due to their availability, acidic monomers with carboxylic acid groups or salts thereof are often selected. If stronger acidic groups are desired, monomers with a phosphonic acid group, sulfonic acid group, or salt thereof can be used. Examples of acidic monomers include, but are not limited to, (meth)acrylic acid, itaconic acid, fumaric acid, crotonic acid, citraconic acid, maleic acid, oleic acid, beta-carboxyethyl (meth)acrylate, 2-sulfoethyl methacrylate, styrene sulfonic acid, 2-acrylamido-2-methylpropanesulfonic acid, vinylphosphonic acid, or mixtures thereof. Any suitable salt of an acidic group can be used. In many embodiments, the cation of the salt is an alkaline metal ion (e.g., sodium, potassium, or lithium ion), an alkaline earth ion (e.g., calcium, magnesium, or strontium ion), an ammonium ion, or an ammonium ion substituted with one or more alkyl or aryl groups.

Other suitable second monomers are those with a single ethylenically unsaturated group and a hydroxyl group. These monomers tend to be polar. The ethylenically unsaturated group can be a (meth)acryloyl group or a vinyl group (i.e., $CH_2=CH_2-$ group) that is not a (meth)acryloyl group. Exemplary monomers with a hydroxyl group include, but are not limited to, hydroxyalkyl (meth)acrylates (e.g., 2-hydroxyethyl acrylate or 3-hydroxypropyl acrylate), hydroxyalkyl (meth)acrylamides (e.g., 2-hydroxyethyl acrylamide or 3-hydroxypropyl acrylamide), and ethoxylated hydroxyethyl methacrylate (e.g., monomers commercially available from Sartomer (Exton, Pa.) under the trade designation CD570, CD571, and CD572).

Still other suitable polar second monomers are those with a single ethylenically unsaturated group and a nitrogen-containing group or a salt thereof. Most of these monomers tend to be polar. The ethylenically unsaturated group can be a (meth)acryloyl group or a vinyl group (i.e., $CH_2=CH_2-$ group) that is not a (meth)acryloyl group. Examples of the nitrogen-containing groups include, but at not limited to, secondary amido groups and tertiary amido groups. Exemplary polar monomers with secondary amido groups include, but are not limited to, N-alkyl (meth)acrylamides such as N-methyl acrylamide, N-ethyl acrylamide, N-isopropyl acrylamide, tert-octyl acrylamide, or N-octyl acrylamide. Exemplary polar monomers with a tertiary amido group include, but are not limited to, N-vinyl caprolactam, N-vinyl-2-pyrrolidone, acryloyl morpholine, and N,N-dialkyl acrylamides such as N,N-dimethyl acrylamide, N,N-diethyl acrylamide, N,N-dipropyl acrylamide, N,N-dibutyl acrylamide, and N,N-dialkylaminoalkyl (meth)acrylates such as N,N-dimethylaminoethyl (meth)acrylate.

Still other suitable second monomers are those with a single ethylenically unsaturated group and an ether group (i.e., a group containing at least one alkylene-oxy-alkylene group of formula —R—O—R— where each R is an alkylene having 1 to 4 carbon atoms) or a polyether group (i.e., a group with multiple alkylene-oxy-alkylene groups). These monomers tend to be polar. Exemplary monomers include, but are not limited to, alkoxylated alkyl (meth)acrylates such as ethoxyethoxyethyl acrylate, 2-methoxyethyl acrylate, and 2-ethoxyethyl acrylate; and poly(alkylene oxide) acrylates such as poly(ethylene oxide) acrylates and poly(propylene oxide) acrylates. The poly(alkylene oxide) acrylates are often referred to as poly(alkylene glycol) acrylates. These monomers can have any suitable end group such as a hydroxyl group or an alkoxy group. For example, when the end group is a methoxy group, the monomer can be referred to as methoxy poly(alkylene glycol) acrylate.

The various polar monomers can be added to increase adhesion of the pressure-sensitive adhesive to an adjacent layer such as a s backing layer or other type of substrate, to enhance the cohesive strength of the (meth)acrylic-based elastomeric material, or both. Any of the polar monomers or salt thereof can be present in any suitable amounts. In some embodiments, the polar monomers are present in amounts up to 15 weight percent based on a total weight of polymerizable material used to form the (meth)acrylic-based elastomeric material. This amount is often up to 10 weight percent or up to 5 weight percent. For example, the polar monomer can be present in an amount in a range of 0 to 15 weight percent, 0.5 to 15 weight percent, 1 to 15 weight percent, 0 to 10 weight percent, 0.5 to 10 weight percent, 1 to 10 weight percent, 0 to 5 weight percent, 0.5 to 5 weight percent, or 1 to 5 weight percent.

The composition used to form the pressure-sensitive adhesive polymer may further include one or more other vinyl monomers such as vinyl esters (e.g., vinyl acetate and vinyl propionate); styrene or derivatives thereof such as alkyl substituted styrene (e.g., α-methyl styrene); vinyl halides; or mixtures thereof. These monomers can be polar or non-polar. If present, these other vinyl monomers can be present in any suitable amount. In some embodiments, the vinyl monomers are present in an amount of up 5 weight percent based on a total weight of polymerizable material used to form the (meth)acrylic-based elastomeric material. For example, the vinyl monomer can be used in amounts up to 4 weight percent, up to 3 weight percent, or up to 2 weight percent. In some embodiments, the vinyl monomer is present in an amount in a range of 0 to 5 weight percent, 0.5 to 5 weight percent, 1 to 5 weight percent, 0 to 3 weight percent, or 1 to 3 weight percent.

A crosslinker having at least two ethylenically unsaturated groups can be used as a second monomer. Although there are other types of crosslinkers in addition to those suitable for use as a second monomer, the use of any type of crosslinker tends to increase the cohesive strength and the tensile strength of the (meth)acrylic-based elastomeric material.

Suitable crosslinkers for use as the second monomer often have multiple (meth)acryloyl groups. Crosslinkers with multiple (meth)acryloyl groups can be di(meth)acrylates, tri (meth)acrylates, tetra(meth)acrylates, penta(meth)acrylates, and the like. These crosslinkers can be formed, for example, by reacting (meth)acrylic acid with a polyhydric alcohol (i.e., an alcohol having at least two hydroxyl groups). The polyhydric alcohol often has two, three, four, or five hydroxyl groups. Mixtures of crosslinkers can be used.

In many embodiments, the crosslinkers contain two (meth) acryloyl groups. Exemplary crosslinkers with two (meth) acryloyl groups include 1,2-ethanediol diacrylate, 1,3-propanediol diacrylate, 1,9-nonanediol diacrylate, 1,12-dodecanediol diacrylate, 1,4-butanediol diacrylate, 1,6-hexanediol diacrylate, butylene glycol diacrylate, bisphenol A diacrylate, diethylene glycol diacrylate, triethylene glycol diacrylate, tetraethylene glycol diacrylate, tripropylene glycol diacrylate, polyethylene glycol diacrylate, polypropylene glycol diacrylate, polyethylene/polypropylene copolymer diacrylate, polybutadiene di(meth)acrylate, propoxylated glycerin tri(meth)acrylate, and neopentylglycol hydroxypivalate diacrylate modified caprolactone.

Exemplary crosslinkers with three or four (meth)acryloyl groups include, but are not limited to, trimethylolpropane triacrylate (e.g., commercially available under the trade designation TMPTA-N from Cytec Industries, Inc. (Smyrna, Ga.) and under the trade designation SR-351 from Sartomer (Exton, Pa.)), pentaerythritol triacrylate (e.g., commercially available under the trade designation SR-444 from Sartomer), tris(2-hydroxyethylisocyanurate) triacrylate (e.g., commercially available under the trade designation SR-368 from Sartomer), a mixture of pentaerythritol triacrylate and pentaerythritol tetraacrylate (e.g., commercially available from Cytec Industries, Inc., under the trade designation PETIA with an approximately 1:1 ratio of tetraacrylate to triacrylate and under the trade designation PETA-K with an approximately 3:1 ratio of tetraacrylate to triacrylate), pentaerythritol tetraacrylate (e.g., commercially available under the trade designation SR-295 from Sartomer), di-trimethylolpropane tetraacrylate (e.g., commercially available under the trade designation SR-355 from Sartomer), and ethoxylated pentaerythritol tetraacrylate (e.g., commercially available under the trade designation SR-494 from Sartomer). An exemplary crosslinker with five (meth)acryloyl groups includes, but is not limited to, dipentaerythritol pentaacrylate (e.g., commercially available under the trade designation SR-399 from Sartomer).

In some embodiments, the crosslinker is a polymeric material that contains at least two (meth)acryloyl groups. For example, the crosslinker can be poly(alkylene oxides) with at least two acryloyl groups (e.g., polyethylene glycol diacrylates commercially available from Sartomer such as SR210, SR252, and SR603) or polyurethanes with at least two (meth) acryloyl groups (e.g., polyurethane diacrylates such as CN9018 from Sartomer). As the molecular weight of the crosslinker increases, the resulting (meth)acrylic-based elastomeric material tends to have a higher elongation before breaking. Polymeric crosslinkers tend to be used in greater weight percent amounts compared to their non-polymeric counterparts.

Other types of crosslinkers can be used rather than those having at least two ethylenically unsaturated groups. One type of crosslinker can have multiple groups that react with functional groups (i.e., functional groups that are not ethylenically unsaturated groups) such as acidic groups on the second monomers. For example, crosslinkers with multiple aziridinyl groups can be used that are reactive with carboxyl groups. Exemplary crosslinkers include bis-amide crosslinkers as described in U.S. Pat. No. 6,777,079 (Zhou et al.). These crosslinkers are not considered to be second monomers.

In other methods of crosslinking, photocrosslinkers (e.g., UV photocrosslinkers) are added. Although some photocrosslinkers have ethylenically unsaturated groups and can be used as the second monomer, most photoiniators do not have ethylenically unsaturated groups and are not considered to be a second monomer. The photocrosslinkers without ethylenically unsaturated groups are often added after polymerization or after at least some polymerization has occurred. For example, the photocrosslinker can be added after the monomers have been partially polymerized to form a viscous, syrup-like composition. Suitable photocrosslinkers added after polymerization or partial polymerization include, for example, multifunctional benzophenones, triazines (such as XL-330, which is 2,4,-bis(trichloromethyl)-6-(4-methoxyphenyl)-triazine from 3M Company, Saint Paul, Minn.), acetophenones, and the like.

If present and regardless of the specific mechanism of crosslinking, any of the crosslinkers can be used in any suitable amount. In many embodiments, the crosslinker is present in an amount of up to 5 parts by weight based on a total weight of polymerizable material. In some embodiments, the crosslinker is present in an amount up to 4 weight percent, up to 3 weight percent, up to 2 weight percent, or up to 1 weight percent. The crosslinker can be present, for example, in amounts greater than 0.01 weight percent, greater than 0.05 weight percent, or greater than 1 weight percent. In some embodiments, the crosslinker is present in an amount in a range of 0 to 5 weight percent, 0.01 to 5 weight percent, 0.05 to 5 weight percent, 0 to 3 weight percent, 0.01 to 3 weight percent, 0.05 to 3 weight percent, 0 to 1 weight percent, 0.01 to 1 weight percent, or 0.05 to 1 weight percent.

As an alternative to adding crosslinkers (including photocrosslinkers), the (meth)acrylic-based elastomeric material can be crosslinked using high energy electromagnetic radiation such as gamma radiation or electron beam radiation.

In some embodiments, the (meth)acrylic-based elastomeric material is prepared from polymerizable material that includes at least 10 weight percent (2-isopropyl-5-methyl) hexyl (meth)acrylate with the remainder being the second monomer. The second monomer can be any of those described above or a combination thereof. For example, the second monomer can be a non-polar (meth)acrylate ester that is not (2-isopropyl-5-methyl)hexyl (meth)acrylate, a non-polar vinyl monomer without a (meth)acryloyl group, a polar monomer, a crosslinker with at least two ethylenically unsaturated groups, or a combination thereof. For example, the polymerizable material can include 10 to 99 weight percent (2-isopropyl-5-methyl)hexyl (meth)acrylate and 1 to 90 weight percent second monomer, 20 to 99 weight percent (2-isopropyl-5-methyl)hexyl (meth)acrylate and 1 to 80 weight percent second monomer, 30 to 99 weight percent (2-isopropyl-5-methyl)hexy (meth)acrylate and 1 to 70 weight percent second monomer, or 40 to 99 weight percent (2-isopropyl-5-methyl)hexyl (meth)acrylate and 1 to 60 weight percent second monomer. The weight percent is based on a total weight of polymerizable material used to form the (meth)acrylic-based elastomeric material.

In some other embodiments, the (meth)acrylic-based elastomeric material is prepared from polymerizable material that contains at least 50 weight percent (2-isopropyl-5-methyl) hexyl (meth)acrylate and up to 50 weight percent of the second monomer based on a total weight of polymerizable material. The second monomer can be any of those described above or a combination thereof. For example, the second monomer can be a non-polar (meth)acrylate ester that is not (2-isopropyl-5-methyl)hexyl (meth)acrylate, a non-polar vinyl monomer without a (meth)acryloyl group, a polar monomer, a crosslinker with two ethylenically unsaturated groups, or a combination thereof. Some (meth)acrylic-based elastomeric materials are formed from 50 to 99.5 weight percent (2-isopropyl-5-methyl)hexyl (meth)acrylate and 0.5 to 50 weight percent of the second monomer, 50 to 99 weight percent (2-isopropyl-5-methyl)hexyl (meth)acrylate and 1 to 50 weight percent of the second monomer, 60 to 99 weight percent (2-isopropyl-5-methyl)hexyl (meth)acrylate and 1 to 40 weight percent of the second monomer, 70 to 99 weight percent (2-isopropyl-5-methyl)hexyl (meth)acrylate and 1 to 30 weight percent of the second monomer, 80 to 99 weight percent (2-isopropyl-5-methyl)hexyl (meth)acrylate and 1 to 20 weight percent of the second monomer, 85 to 99 weight percent (2-isopropyl-5-methyl)hexyl (meth)acrylate and 1 to 15 weight percent of the second monomer, or 90 to 99 weight percent (2-isopropyl-5-methyl)hexyl (meth)acrylate and 1 to 10 weight percent of the second monomer. The weight percent is based on a total weight of polymerizable material used to form the (meth)acrylic-based elastomeric material.

In some more specific embodiments, the (meth)acrylic-based elastomeric material is prepared from a polymerizable material that includes at least 50 weight percent (2-isopropyl-5-methyl)hexyl (meth)acrylate and up to 15 weight percent of a second monomer that is a polar monomer. For example, the polymerizable material can include 50 to 99.5 weight percent (2-isopropyl-5-methyl)hexyl (meth)acrylate and 0.5 to 15 weight percent of the polar monomer, 50 to 99 weight percent (2-isopropyl-5-methyl)hexyl (meth)acrylate and 1 to 15 weight percent of the polar monomer, 60 to 99 weight percent (2-isopropyl-5-methyl)hexyl (meth)acrylate and 1 to 15 weight percent of the polar monomer, 70 to 99 weight percent (2-isopropyl-5-methyl)hexyl (meth)acrylate and 1 to 15 weight percent of the polar monomer, 80 to 99 weight percent (2-isopropyl-5-methyl)hexyl (meth)acrylate and 1 to 15 weight percent of the polar monomer, or 85 to 99 weight percent (2-isopropyl-5-methyl)hexyl (meth)acrylate and 1 to 15 weight percent of the polar monomer. Various non-polar monomers that are not (2-isopropyl-5-methyl)hexyl (meth) acrylate, crosslinkers with at least two ethylenically unsaturated groups, or both can be added to any of these polymerizable materials to bring the total to 100 weight percent. For example, the polymerizable material can include at least 1 weight percent non-polar monomers such as 1 to 40 weight percent, 1 to 35 weight percent, 1 to 30 weight percent, 1 to 20 weight percent, or 1 to 10 weight percent. As another example, any of the polymerizable materials can include up to 5 weight percent crosslinker with two ethylenically unsaturated groups such as 0.01 to 5 weight percent, 0.05 to 5 weight percent, or 1 to 5 weight percent.

An initiator for free radical polymerization is typically added to the various monomers used to form the (meth) acrylic-based elastomeric material. The polymerization initiator can be a thermal initiator, a photoinitiator, or both. Any suitable thermal initiator or photoinitator known for free radical polymerization reactions can be used. The initiator is typically present in an amount in the range of 0.01 to 5 weight percent, in the range of 0.01 to 2 weight percent, in the range of 0.01 to 1 weight percent, or in the range of 0.01 to 0.5 weight percent based on a total weight of polymerizable material in the first polymerizable mixture.

As used herein, the polymerizable mixture (i.e., polymerizable reaction mixture) refers to the polymerizable material plus any other components added to the polymerizable materials to prepare the polymerized product.

In some embodiments, a thermal initiator is used. Thermal initiators can be water-soluble or water-insoluble (i.e., oil-soluble) depending on the particular polymerization method used. Suitable water-soluble initiators include, but are not limited to, persulfates such as potassium persulfate, ammonium persulfate, sodium persulfate, and mixtures thereof; an oxidation-reduction initiator such as the reaction product of a persulfate and a reducing agent such as a metabisulfite (e.g., sodium metabisulfite) or a bisulfate (e.g., sodium bisulfate); or 4,4'-azobis(4-cyanopentanoic acid) and its soluble salts (e.g., sodium or potassium). Suitable oil-soluble initiators include, but are not limited to, various azo compound such as those commercially available under the trade designation VAZO from E. I. DuPont de Nemours Co. including VAZO 67, which is 2,2'-azobis(2-methylbutane nitrile), VAZO 64, which is 2,2'-azobis(isobutyronitrile), and VAZO 52, which is (2,2'-azobis(2,4-dimethylpentanenitrile); and various peroxides such as benzoyl peroxide, cyclohexane peroxide, lauroyl peroxide, and mixtures thereof.

In many embodiments, a photoinitiator is used. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, N.J.) or under the trade designation ESACURE KB-1 from Sartomer (Exton, Pa.)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(0-ethoxycarbonyl)oxime. Other suitable photoinitiators include, for example, 1-hydroxycyclohexyl phenyl ketone (IRGACURE 184), bis(2,4,6-trimethylbenzoyl)phenylphosphineoxide (IRGACURE 819), 1-[4-(2-hydroxyethoxy)phenyl]-2-hydroxy-2-methyl-1-propane-1-one (IRGACURE 2959), 2-benzyl-2-dimethylamino-1-(4-morpholinophenyl)butanone (IRGACURE 369), 2-methyl-1-[4-(methylthio)phenyl]-2-morpholinopropan-1-one (IRGACURE 907), and 2-hydroxy-2-methyl-1-phenyl propan-1-one (DAROCUR 1173).

The polymerizable mixture may optionally further contain a chain transfer agent to control the molecular weight of the resultant elastomeric material. Examples of useful chain transfer agents include, but are not limited to, carbon tetrabromide, alcohols, mercaptans such as isooctylthioglycolate, and mixtures thereof. If used, the polymerizable mixture may include up to 0.5 weight of a chain transfer agent based on a total weight of polymerizable material. For example, the polymerizable mixture can contain 0.01 to 0.5 weight percent, 0.05 to 0.5 weight percent, or 0.05 to 0.2 weight percent chain transfer agent.

The polymerizable mixture used to form the (meth)acrylic-based elastomeric material can include a organic solvent or can be either free or essentially free of an organic solvent. As used herein, the term "essentially free" in reference to an organic solvent means that the organic solvent is present in an amount less than 5 weight percent, less than 4 weight percent, less than 3 weight percent, less than 2 weight percent, or less than 1 weight percent based on the weight of the polymerizable mixture or polymerizable material. If an organic solvent is included in the polymerizable mixture, the amount is often selected to provide the desired viscosity. Examples of suitable organic solvents include, but are not limited to, methanol, tetrahydrofuran, ethanol, isopropanol, heptane, acetone, methyl ethyl ketone, methyl acetate, ethyl acetate, toluene, xylene, and ethylene glycol alkyl ether. Those solvents can be used alone or as mixtures thereof.

The (meth)acrylic-based elastomeric material can be prepared by a variety of conventional free radical polymerization methods, including solution, bulk (i.e., with little or no solvent), dispersion, emulsion, and suspension polymerization processes. The particular method used may be influenced by the use of the final pressure-sensitive adhesive composition. The resulting (meth)acrylic-based elastomeric materials can be random or block copolymers. In many embodiments, the (meth)acrylic-based elastomeric material is a random copolymer.

To be useful as a pressure-sensitive adhesive, the elastomeric material typically has a storage modulus less than 300,000 Pascals at 25° C. The storage modulus of the (meth)acrylic-based elastomeric material usually is no greater than 200,000 Pascals, no greater than 100,000 Pascals, no greater than 80,000 Pascals, no greater than 50,000 Pascals, or no greater than 25,000 Pascals at 25° C. An elastomeric material with a lower storage modulus is often used to provide a pressure-sensitive adhesive that is readily conformable to a substrate, that can form a rapid bond with the substrate, and that has good peel adhesion performance. However, a lower storage modulus material generally has less internal or cohesive strength and this may compromise the shear holding power or clean removability of the pressure-sensitive adhesive. Depending on the particular use of the pressure-sensitive adhesive, the elastomeric material is often selected based on the desired performance characteristics such as greater cohesive strength or greater conformability and rapid bond strength. For example in applications in which a high degree of shear holding performance, higher temperature performance, or clean removability is desired of the pressure-sensitive adhesive, a higher storage modulus elastomeric material may be selected as long as the pressure-sensitive adhesive has sufficient tackiness.

In some embodiments, the (meth)acrylic-based elastomeric materials themselves may function as a pressure-sensitive adhesive. In other embodiments, one or more tackifiers, one or more plasticizers, or a mixture thereof can be combined with the elastomeric materials. Tackifiers (i.e., tackifying agents or tackifying resins) and plasticizers (i.e., plasticizing agents) are often added to modulate the $T_g$, modulate the storage modulus, and to alter the tackiness of the pressure-sensitive adhesive.

Any tackifier that is included in the pressure-sensitive adhesive compositions is typically selected to be miscible with the (meth)acrylic-based elastomeric material. Any tackifier typically included in conventional pressure-sensitive adhesive compositions can be used. Either solid or liquid tackifiers can be added. Solid tackifiers generally have a number average molecular weight (Mn) of 10,000 grams per mole or less and a softening point above about 70° C. Liquid tackifiers are viscous materials that have a softening point of about 0° C. to about 70° C.

Suitable tackifying resins include rosin resins such as rosin acids and their derivatives (e.g., rosin esters); terpene resins such as polyterpenes (e.g., alpha pinene-based resins, beta pinene-based resins, and limonene-based resins) and aromatic-modified polyterpene resins (e.g., phenol modified polyterpene resins); coumarone-indene resins; and petroleum-based hydrocarbon resins such as C5-based hydrocarbon resins, C9-based hydrocarbon resins, C5/C9-based hydrocarbon resins, and dicyclopentadiene-based resins. These tackifying resins, if added, can be hydrogenated to lower their color contribution to the pressure-sensitive adhesive composition. Combinations of various tackifiers can be used, if desired.

Tackifiers that are rosin esters are the reaction products of various rosin acids and alcohols. These include, but are not limited to, methyl esters of rosin acids, triethylene glycol esters of rosin acids, glycerol esters of rosin acids, and pentaerythritol esters of rosin acids. These rosin esters can be hydrogenated partially or fully to improve stability and reduce their color contribution to the pressure-sensitive adhesive composition. The rosin resin tackifiers are commercially available, for example, from Eastman Chemical Company under the trade designations PERMALYN, STAYBELITE, and FORAL as well as from Newport Industries under the trade designations NUROZ and NUTAC. A fully hydrogenated rosin resin is commercially available, for example, from Eastman Chemical Company under the trade designation FORAL AX-E. A partially hydrogenated rosin resin is commercially available, for example, from Eastman Chemical Company under the trade designation STAYBELITE-E.

Tackifiers that are hydrocarbon resins can be prepared from various petroleum-based feed stocks. These feedstocks can be aliphatic hydrocarbons (mainly C5 monomers with some other monomers present such as a mixture of trans-1,3-pentadiene, cis-1,3-pentadiene, 2-methyl-2-butene, dicyclopentadiene, cyclopentadiene, and cyclopentene), aromatic hydrocarbons (mainly C9 monomers with some other monomers present such as a mixture of vinyl toluenes, dicyclopentadiene, indene, methylstyrene, styrene, and methylindenes), or mixtures thereof. Tackifiers derived from C5 monomers are referred to as C5-based hydrocarbon resins while those derived from C9 monomers are referred to as C9-based hydrocarbon resins. Some tackifiers are derived from a mixture of C5 and C9 monomers or are a blend of C5-based hydrocarbon tackifiers and C9-based hydrocarbon tackifiers. These tackifiers can be referred to as C5/C9-based hydrocarbon tackifiers. Any of these resins can be partially or fully hydrogenated to improve their color and thermal stability.

The C5-based hydrocarbon resins are commercially available from Eastman Chemical Company under the trade designations PICCOTAC and EASTOTAC, from Cray Valley under the trade designation WINGTACK, from Neville Chemical Company under the trade designation NEVTAC LX, and from Kolon Industries, Inc. under the trade designation HIKOREZ. The C5-based hydrocarbon resins are commercially available from Eastman Chemical with various degrees of hydrogenation under the trade designation EASTOTACK.

The C9-based hydrocarbon resins are commercially available from Eastman Chemical Company under the trade designation PICCO, KRISTLEX, PLASTOLYN, and PICCOTAC, and ENDEX, from Cray Valley under the trade designations NORSOLENE, from Ruetgers N.V. under the trade designation NOVAREZ, and from Kolon Industries, Inc. under the trade designation HIKOTAC. These resins can be partially or fully hydrogenated. Prior to hydrogenation, the C9-based hydrocarbon resins are often about 40 percent aromatic as measured by proton Nuclear Magnetic Resonance. Hydrogenated C9-based hydrocarbon resins are commercially available, for example, from Eastman Chemical under the trade designations REGALITE and REGALREX that are 50 to 100 percent (e.g., 50 percent, 70 percent, 90 percent, and 100 percent) hydrogenated. The partially hydrogenated resins typically have some aromatic rings.

Various C5/C9-based hydrocarbon tackifiers are commercially available from Arakawa under the trade designation ARKON, from Zeon under the trade designation QUINTONE, from Exxon Mobile Chemical under the trade designation ESCOREZ, and from Newport Industries under the trade designations NURES and H-REZ.

Any of the tackifiers may be used in amounts of up to 150 parts relative to 100 parts of the (meth)acrylic-based elastomeric material. For example, the tackifiers can be used in amounts up to 125 parts, up to 100 parts, up to 80 parts, up to 60 parts, or up to 40 parts. The amount of tackifier can be, for example, in a range of 0 to 150 parts, 1 to 150 parts, 10 to 150 parts, 20 to 150 parts, 20 to 100 parts, 50 to 150 parts, 50 to 100 parts, or 20 to 80 parts based on 100 parts of the (meth) acrylic-based elastomeric material.

Some pressure-sensitive adhesive compositions can include one or more plasticizers. The plasticizer is typically selected to be compatible with (i.e., miscible with) the other components in the composition such as the (meth)acrylic elastomeric material and any optional tackifier. Suitable plasticizers include, but are not limited to, various polyalkylene oxides (e.g., polyethylene oxides or propylene oxides), adipic acid esters, formic acid esters, phosphoric acid esters, benzoic acid esters, phthalic acid esters, sulfonamides, and naphthenic oils. The plasticizers can be used in any desired amount such as in a range of 0 to 100 weight percent or in a range of 1 to 100 weight percent based on the weight of (meth)acrylic-based elastomeric material. For example, the plasticizer can be in a range of 1 to 50 weight percent, 5 to 50 weight percent, 1 to 25 weight percent, 5 to 25 weight percent, or 1 to 10 weight percent based on the weight of the (meth)acrylic-based elastomeric material.

The polymerizable mixture can further include other optional components such as, for example, pigments, glass beads, polymer beads (e.g., expandable beads or expanded beads), hydrophobic or hydrophilic silica, calcium carbonate, fibers (e.g., glass, polymeric material, ceramic material, or mixtures thereof), blowing agents, fire retardants, oxidants, and stabilizers. These optional components can be added in any amount sufficient to obtain the desired physical properties.

In some methods of preparing the pressure-sensitive adhesive, the polymerizable mixture containing the monomers used to form the (meth)acrylic-based elastomeric material are partially polymerized to increase the viscosity to that corresponding to a syrup-like material. Often, (2-isopropyl-5-methyl)hexyl (meth)acrylate and any monovalent second monomers are mixed with a portion of a free radical polymerization initiator. Depending on the type of initiator added, the mixture is exposed to actinic radiation or heat to partially polymerize the monovalent monomers (i.e., monomers with a single ethylenically unsaturated group). Then, the crosslinker or photocrosslinker and any remaining portion of the initiator are added to the syrup-like, partially polymerized material. Optional tackifiers, plasticizers, or both can also be combined with the partially polymerized material. The resulting mixture can be more readily applied as a coating composition onto a substrate such as a support (e.g., release liner) or another layer (e.g., backing layer). The coating layer can then be exposed to actinic radiation if a photoinitiator is present or to heat if a thermal initiator is present. Exposure to actinic radiation or heat results in the further reaction of polymerizable material within the coating composition.

The pressure-sensitive adhesive compositions can be coated upon a variety of substrates to produce adhesive-coated articles. The substrates can be flexible or inflexible and can be formed of a polymeric material, glass or ceramic material, metal, or combinations thereof. Suitable polymeric substrates include, but are not limited to, polymeric films such as those prepared from polypropylene, polyethylene, polyvinyl chloride, polyester (polyethylene terephthalate or polyethylene naphthalate), polycarbonate, polymethyl(meth) acrylate (PMMA), cellulose acetate, cellulose triacetate, and ethyl cellulose. Foam backings may be used. Examples of other substrates include, but are not limited to, metals such as stainless steel, metal or metal oxide coated polymeric material, metal or metal oxide coated glass, and the like.

The pressure-sensitive adhesive compositions may be used in any article conventionally known to use such compositions such as labels, tapes, signs, covers, marking indices, display components, touch panels, and the like. Flexible backing materials having microreplicated surfaces can be used.

The pressure-sensitive adhesive compositions can be coated on a substrate using any conventional coating techniques modified as appropriate to the particular substrate. For example, these compositions can be applied to a variety of solid substrates by methods such as roller coating, flow coating, dip coating, spin coating, spray coating knife coating, and die coating. These various methods of coating allow the compositions to be placed on the substrate at variable thicknesses thus allowing a wider range of use of the compositions.

Any suitable thickness can be used for the pressure-sensitive adhesive layer or layers. In many embodiments, each pressure-sensitive adhesive layer has a thickness no greater than 20 mils (500 micrometers), no greater than 10 mils (250 micrometers), no greater than 5 mils (125 micrometers), no greater than 4 mils (100 micrometers), no greater than 3 mils (75 micrometers), or no greater than 2 mils (50 micrometers). The thickness of the pressure-sensitive adhesive layer is often at least 0.5 mils (12.5 micrometers) or at least 1 mil (25 micrometers). For example, the thickness of the pressure-sensitive adhesive layer can be in the range of 0.5 mils (2.5 micrometers) to 20 mils (500 micrometers), in the range of 0.5 mils (5 micrometers) to 10 mils (250 micrometers), in the range of 0.5 mils (12.5 micrometers) to 5 mils (125 micrometers), in the range of 1 mil (25 micrometers) to 3 mils (75 micrometers), or in the range of 1 mil (25 micrometers) to 2 mils (50 micrometers).

The pressure-sensitive adhesives typically bond well to a variety of high and low surface energy substrates such as, for example, polypropylene, high density polyethylene (HDPE), polystyrene, poly(methyl methacrylate), other plastics, ceramics, glasses, and metals.

The substrate to which the pressure-sensitive adhesive composition can be applied is selected depending on the particular application. For example, the adhesive can be applied to sheeting products (e.g., decorative graphics and reflective products), label stock, and tape backings. Additionally, the adhesive may be applied directly onto other substrates such as a panel (e.g., a metal panel such as an automotive panel) or a glass window so that yet another substrate or object can be attached to the panel or window.

The pressure-sensitive adhesive composition can also be provided in the form of a pressure-sensitive adhesive transfer tape in which at least one layer of the adhesive is disposed on a release liner for application to a permanent substrate at a later time. The pressure-sensitive adhesive composition can also be provided as a single coated or double coated tape in which the adhesive is disposed on a permanent backing. Backings can be made from plastics (e.g., polypropylene, including biaxially oriented polypropylene, vinyl, polyethylene, and polyester such as polyethylene terephthalate), nonwovens (e.g., papers, cloths, and nonwoven scrims), metal foils, foams (e.g., polyacrylic, polyethylene, polyurethane, and neoprene), and the like. Foams are commercially available from various suppliers such as 3M Co. (Saint Paul, Minn.), Sekisui Voltek (Lawrence, Mass.), and others.

The substrate may be formed as a coextruded sheet with the pressure-sensitive adhesive composition on one or both sides of the substrate. Alternatively, the pressure-sensitive adhesive composition may be laminated to one or both sides of the substrate. When the adhesive is laminated to the substrate, it may be desirable to treat the surface of the substrate to improve the adhesion. Such treatments are typically selected based on the nature of the materials in the pressure-sensitive adhesive composition and in the substrate and include primers and surface modifications (e.g., corona treatment and surface abrasion).

For a single-sided tape, the pressure-sensitive adhesive is applied to one surface of the backing material and a suitable release material is applied to the opposite surface of the backing material. Release materials are known and include materials such as, for example, silicones, polyethylenes, polycarbamates, polyacrylics, and the like. For double coated tapes, the pressure-sensitive adhesive is applied to one surface of the backing material and a second adhesive is disposed on the opposite surface of the backing material. The second adhesive can be identical to the pressure-sensitive adhesive (i.e., the pressure-sensitive includes a (meth)acrylic-based elastomeric material formed using (2-isopropyl-5-methyl) hexyl (meth)acrylate), can be similar to the pressure-sensitive adhesive (e.g., the same (meth)acrylic-based elastomeric material in a different formulation), or can be different than the pressure-sensitive adhesive (a different type of adhesive or a different (meth)acrylic-based elastomeric material). Double coated tapes are often carried on a release liner.

In some applications, the pressure-sensitive adhesive is used as a hot-melt adhesive composition. That is, the pressure-sensitive adhesive composition is heated for application to a substrate. When used as a hot-melt adhesive, the pressure-sensitive adhesive is typically prepared without a crosslinker. Pressure-sensitive adhesives based on elastomeric materials with good cohesive strength and good shear holding performance can be prepared without the use of a crosslinker.

Various items are provided that are pressure-sensitive adhesive compositions or articles that contain the pressure-sensitive adhesive composition.

Item 1 is a pressure-sensitive adhesive composition comprising an (meth)acrylic-based elastomeric material comprising a reaction product of polymerizable material. The polymerizable material comprises (a) (2-isopropyl-5-methyl) hexyl (meth)acrylate in an amount of at least 10 weight percent based on a total weight of the polymerizable material, and (b) a second monomer having an ethylenically unsaturated group.

Item 2 is the pressure-sensitive adhesive composition of item 1, wherein the second monomer comprises a non-polar (meth)acrylate ester that is not (2-isopropyl-5-methyl)hexyl (meth)acrylate, a non-polar vinyl monomer without a (meth)acryloyl group, a polar monomer, a crosslinker with at least two ethylenically unsaturated groups, or a combination thereof.

Item 3 is the pressure-sensitive adhesive composition of item 2, wherein the polar monomer comprises an acidic group, a hydroxyl group, or a nitrogen-containing group.

Item 4 is the pressure-sensitive adhesive composition of item 3, wherein the acidic group is a carboxyl group or a salt thereof.

Item 5 is the pressure-sensitive adhesive composition of any one of items 1 to 4, wherein the polymerizable material comprises at least 20 to 99.5 weight percent (2-isopropyl-5-methyl)hexyl (meth)acrylate and 0.5 to 80 weight percent of the second monomer based on the total weight of polymerizable material.

Item 6 is the pressure-sensitive adhesive composition of any one of items 1 to 4, wherein the polymerizable material comprises at least 50 to 99.5 weight percent (2-isopropyl-5-methyl)hexyl (meth)acrylate and 0.5 to 50 weight percent of the second monomer based on the total weight of polymerizable material.

Item 7 is the pressure-sensitive adhesive composition of item 5 or 6, wherein the second monomer comprises a polar monomer and the polar monomer is present in an amount up to 15 weight percent based on the total weight of polymerizable material.

Item 8 is the pressure-sensitive adhesive composition of any one of items 1 to 7, wherein the pressure-sensitive adhesive further comprises 1 to 150 part tackifier for 100 parts (meth)acrylic-based elastomeric material.

Item 9 is an article comprising a pressure-sensitive adhesive composition and a substrate adhered to the pressure-sensitive adhesive composition. The pressure-sensitive adhesive composition comprises an (meth)acrylic-based elastomeric material comprising a reaction product of polymerizable material. The polymerizable material comprises (a) (2-isopropyl-5-methyl)hexyl (meth)acrylate in an amount of at least 10 weight percent based on a total weight of the polymerizable material, and (b) a second monomer having an ethylenically unsaturated group.

Item 10 is the article of item 9, wherein the second monomer comprises a non-polar (meth)acrylate ester that is not (2-isopropyl-5-methyl)hexyl (meth)acrylate, a non-polar vinyl monomer without a (meth)acryloyl group, a polar monomer, a crosslinker with at least two ethylenically unsaturated groups, or a combination thereof.

Item 11 is the article of item 9, wherein the (meth)acrylic-based elastomeric material is crosslinked.

Item 12 is the article of item 9, wherein the (meth)acrylic-based elastomeric material is not crosslinked.

Item 13 is the article of any one of items 9 to 12, wherein the pressure-sensitive adhesive composition further comprises 1 to 150 part tackifier for 100 parts (meth)acrylic-based elastomeric material.

Item 14 is the article of any one of items 9 to 13, wherein the polymerizable material comprises at least 20 to 99.5 weight percent (2-isopropyl-5-methyl)hexyl (meth)acrylate and 0.5 to 80 weight percent of the second monomer based on the total weight of polymerizable material.

Item 15 is the article of any one of items 9 to 13, wherein the polymerizable material comprises at least 50 to 99.5 weight percent (2-isopropyl-5-methyl)hexyl (meth)acrylate and 0.5 to 50 weight percent of the second monomer based on the total weight of polymerizable material.

EXAMPLES

Unless otherwise noted, all chemicals used in the examples can be obtained from Sigma-Aldrich Corp. (Saint Louis, Mo.).

TABLE 1

Glossary of Materials

| Component | Description |
|---|---|
| IOA | Isooctyl acrylate obtained from Sigma-Aldrich (Saint Loius, MO) |
| IPMHA | (2-isopropyl-5-methyl)hexyl acrylate prepared as described in Preparatory Example 1 |
| PHA | 2-propylheptyl acrylate obtained from BASF (Florham Park, NJ) |
| DMOA | 3,7 dimethyloctyl acrylate prepared as described in Preparatory Example 2 |
| LA | Lauryl acrylate obtained from Sartomer (Exton, PA) |
| AA | Acrylic acid obtained from Sigma-Aldrich (Saint Loius, MO) |
| HEA | Hydroxyethyl acrylate obtained from Alfa Aesar (Ward Hill, MA) |
| I-651 | IRGACURE 651, which is a trade designation of BASF (Florham Park, NJ) for 2-dimethoxy-2-phenylacetophenone |
| IOTG | Isooctylthiolglycolate obtained from Sigma-Aldrich (Saint Loius, MO) |
| XL-330 | 2,4,-Bis(trichloromethyl)-6-(4-methoxyphenyl)-triazine obtained from 3M Company (Saint Paul, MN) |
| R-6108 | REGALREZ 6108, which is a hydrocarbon tackifier obtained from Eastman Chemical Co. (Kingsport, TN) |
| E-2520 | ESCOREZ 2520, which is a hydrocarbon tackifier obtained from ExxonMobile (Houston, TX) |
| P-1020 | PICCOTAC 1020, which is a hydrocarbon tackifier obtained from Eastman Chemical Co. (Kingsport, TN) |
| S-141 | SANTICIZER141, which is a plasticizer obtained from Ferro Corporation (Cleveland, OH) |

Test Methods

Differential Scanning Calorimetric Analysis

Differential Scanning calorimetry (DSC) analysis was utilized to characterize homopolymers (no other polymerizable material was added) of select monomers from Table 1. To generate homopolymer samples for DSC analysis, the monomer was mixed with 0.5 wt % IRGACURE 651 for 1 hour in an amber vial with magnetic stirring. Approximately 10 mg of each of monomer solution was placed in an individual standard aluminum DSC pan (TA Instruments Model T080715). Pans were placed in a nitrogen purged glove box for 5 minutes and then irradiated with UV light (365 nanometers and approximately 1.5 mW/cm$^2$) while in this environment.

Pans with cured polymer were individually placed on one of the differential posts in the enclosed DSC cell along with an empty reference pan on the opposite post. The temperature was raised to 55° C. and held for 10 minutes to thermally anneal the polymer sample. The sample was then cycled between −95° C. and 55° C. twice at 3° C./min. Transitions such as the crystalline temperature ($T_c$), melting temperature ($T_m$), and glass transition temperature ($T_g$) were identified in the scanning profile of heat flow versus temperature. Typically, crystallization and melting transitions are seen as positive and negative heat flow peaks that correspond to the latent heat that is given off or absorbed, respectively, as the sample is cooled and heated. Conversely a glass transition is generally represented by a shift in the profile slope upon heating as the heat capacity of the sample after the transition is altered. The glass transition temperature was recorded at the inflection point of the curve associated with this shift in heat flow profile.

Dynamic Mechanical Analysis

Dynamic Mechanical Analysis (DMA) of generated homopolymers was accomplished using an parallel plate rheometer (TA Instruments Model AR2000) to characterize the physical properties of each sample as a function of temperature. To generate homopolymer samples of select monomers from Table 1 (IOA, IPMHA, PHA, DMOA, and LA), each monomer was separately mixed with 0.5 wt % IRGACURE 651 for 1 hour in an amber vial with magnetic stirring. Samples were cured in a clamped mold using a 2 millimeter thick silicone spacer cavity between release liners and glass plates. The layers in the clamped assembly were in the following order: glass plate, release liner, silicone spacer having a cavity filled with the sample, release liner, and glass plate. The mold was placed in a vertical position so that only one edge of the mold was in contact with air. The sample was then cured for 10 minutes on each glass face side with UV irradiation (36 nanometer wavelength with approximately 1.5 mW/cm$^2$). After curing, the glass plates and silicone spacers were removed to leave the homopolymer film between release liners.

For each sample, approximately 0.2 grams of the polymerized material was centered between 8 millimeter diameter parallel plates of the rheometer and compressed until the edges of the sample were uniform with the edges of the top and bottom plates. The furnace doors that surround the parallel plates and shafts of the rheometer were shut and the temperature was raised to 120° C. and held for 5 minutes. The temperature was then decreased from 120° C. to −70° C. at 3° C./min while the parallel plates were oscillated at a frequency of 1 Hz and a constant strain of 0.1 percent. While many physical parameters of the material are recorded during the temperature ramp, storage modulus (G'), loss modulus (G"), and tan delta are of primary importance in the characterization of polymers.

The glass transition temperature ($T_g$) of the polymeric material can be measured by first determining its storage (G') and loss shear moduli (G"). The ratio of G"/G', a unit less parameter typically denoted "tan delta", is plotted versus temperature. The maximum point (point where the slope is zero) in the transition region between the glassy region and the rubbery region of the tan delta curve, if well defined, determines the $T_g$ of the polymeric material at that particular frequency.

The shape and width of the tan delta profile versus temperature can provide insight into the nature of the polymer network structure or polymer chain structure that is present in each polymeric material. For example, a broad tan delta peak often suggests greater heterogeneity within a polymer network or polymer chain with a broad distribution of segmental motions at different temperatures. This characterization can be taken further to a system in which there are two distinct peaks within the tan delta profile often suggesting discrete phase separated domains within a polymer network or polymer chain with multiple modes of segmental motion within the polymer backbone or side chain structures. For each of the polymeric materials generated, storage modulus was recorded at room temperature (25° C.). The $T_g$ was recorded at the peak of the tan delta curve. The width of the tan delta peak was quantified by taking the peak width at a fixed height of approximately half of the peak intensity (FHPW).

Peel Adhesion Strength

Peel adhesion is the force required to remove (peel) a coated flexible sheet material from a test panel measured at a specific angle and rate of removal. The peel force is expressed in Newtons per width of coated sheet (Newtons/dm). For each PSA coated sheet material (PSA positioned between a release liner and polyethylene terephthalate backing material film), a strip approximately 12.7 millimeters wide and 15 centimeters long was cut. The release layer was removed and the adhesive strip (PSA on PET backing material) was then applied to the clean face of a stainless steel test panel. A heavy rubber roller was used to apply the strip. The free end of the adhesive strip was doubled back so that the angel of removal was 180 degrees. The free end was attached to the horizontal arm of the adhesion tester scale. The stainless steel plate was then affixed to the platform of the instrument that was mechanized to move at a controlled rate (30.5 cm/min) away from the scale. The peel test was started soon after the adhesive was applied to the stainless steel plate without allowing for an induction time for adhesion to build. The scale reading in ounces was recorded during the test as an average of both the peak and minimum forces during the peel. Three peel tests were run for each sample and averaged to yield the peel adhesion value.

Peel adhesion was also measured for each sample using the above procedure on test panels of high density polyethylene (HDPE, International Plastics (Edina, Minn.)) rather than stainless steel.

Shear Strength

Shear strength (i.e., cohesive strength) of an adhesive material is directly related to the internal strength or cohesiveness of the sample and is typically quantified by the amount of force required to pull an adhesive strip from a standard flat surface with which the sample has been affixed to. Here, shear strength is measured in terms of the time required to pull a defined area of adhesive coated backing material from a stainless steel test panel under the stress of a constant or static load parallel to the test panel.

Shear tests at 25° C. were conducted using pressure-sensitive adhesive coated PET backing material having a dried coating thickness of approximately 0.05 millimeters. Cut adhesive strips were applied to a clean stainless steel panel such that a 25.4 millimeter by 25.4 millimeter portion of each strip was in firm contact with the panel and one end portion of each strip was free. The panel with adhesive strip was held in a rack such that the panel formed a 180 degree angle with the extended free end which was then tensioned by applying a one kilogram hanging weight. The time elapsed for each tape example to separate from the test panel is recorded as the shear strength in minutes.

For high temperature shear tests at 70° C., the portion of pressure-sensitive adhesive in firm contact with the stainless steel panel was reduced to 12.7 millimeter by 25.4 millimeter and the weight reduced to 500 grams. The rack was enclosed in a 70° C. oven for the duration of the test. Two shear tests were performed for each sample adhesive and the resulting hang times were averaged. Samples that are still hanging after 10,000 minutes are terminated and recorded as +10,000 min.

Preparatory Example 1

Preparation of (2-isopropyl-5-methyl)hexyl acrylate (IPMHA)

A mixture of tetrahydrolavandulol (83.50 grams, 0.53 moles) obtained from TCI America (Portland, Oreg.), triethylamine (59.10 grams, 0.58 moles) obtained from Alfa Aesar (Ward Hill, Mass.), and dichloromethane (500 mL) was cooled to 5° C. using an ice bath. Acryloyl chloride (52.87 grams, 0.58 moles) obtained from Sigma-Aldrich (Saint Louis, Mo.) was added dropwise over 1 hour. The reaction was stirred overnight at room temperature and then filtered. The solvent was removed under vacuum. The crude oil was diluted with ethyl acetate (300 mL) and then washed with saturated aqueous sodium bicarbonate solution (200 mL). The organic phase was separated and concentrated under vacuum. The crude oil was distilled under high vacuum to give the product, which was a colorless oil having a boiling point 55-58° C. at 0.1 millimeter Hg. The yield was 76.51 grams.

Preparatory Example 2

3,7-dimethyl octyl acrylate (DMOA)

A mixture of 3,7-dimethyl-1-octanol (900 grams, 5.69 moles) obtained from Sigma-Aldrich (Saint Louis, Mo.)), acrylic acid (491.58 grams, 6.82 moles), toluene (600 ml), p-toluenesulfonic acid (21 grams), and phenothiazine (4.68 grams) was added to a 2 liter round bottom flask fitted with a Dean Stark trap and a water cooled condenser. The mixture was heated to reflux to azeotropically remove the water formed during the esterification. The reaction was monitored by gas liquid chromatography. After 4 hours, an additional charge of acrylic acid (20 grams) was added. The reaction was complete after a total of 6 hours at reflux. The mixture was then cooled to room temperature and filtered through a medium glass frit. Toluene was removed using a rotary evaporator with an air bleed into the solution during the removal process. An additional 3 grams of phenothizine was added and the remaining mixture was distilled under vacuum (0.3 mm Hg). The product fraction boiled at 75-80° C. The resulting distillate was finally washed with 100 ml of 2.5 weight percent sodium hydroxide solution and then twice with 100 ml of water.

DSC and DMA Analysis of Homopolymer Samples

Homopolymers of each base monomer shown in Table 2 were analyzed using the DSC and DMA test procedures described above. In Table 2, the term "NO" indicates that a transition event was not observed during the temperature scan from −95° C. to 55° C.

TABLE 2

Thermal Transitions and Mechanical Properties of Alky Acrylate Homopolymer

| Base Monomer | Alkyl Carbon Number | $T_c$ (° C.) | $T_m$ (° C.) | $T_g$ (° C.) | $T_g$ (° C.) | Storage Modulus at 25° C. (Pa) | FWPH (° C.) |
|---|---|---|---|---|---|---|---|
| | | DSC Analysis | | | | DMA Analysis | |
| IOA | 8 | NO | NO | −65 | −32 | 19,500 | 27 |
| IPMHA | 10 | NO | NO | −44 | −10 | 80,000 | 54 |
| PHA | 10 | NO | NO | −69 | −46 | 10,000 | 39 |
| DMOA | 10 | NO | NO | −64 | −33 | 16,650 | 28 |
| LA | 12 | −8 | 4 | NO | NO | 4,500 | NO |

The $T_g$ and room temperature storage modulus of the IPMHA homopolymer were both significantly higher than the corresponding values for homopolymers of the other two C10 monomers (PHA and DMOA). This is thought to be due to the greater degree of branching in the side chain structure of IPMHA (3 branch points) compared to DMOA (2 branch points) and PHA (1 branch point). Lauryl acrylate, which has a higher alkyl carbon number but no branching, has a $T_c$ that is much higher than the more branched IPMHA.

Examples 1-4 and Comparative Examples 1-7

Peel and Shear Adhesive Properties of Crosslinked PSA Films

To examine its utility in a pressure sensitive adhesive article, each base monomer listed in Table 3 was copolymerized and formulated into PSA films using the following procedure. 28.5 grams of the base monomer (i.e., IPMHA, IOA, PHA, or DMOA), 0.02 grams of IRGACURE 651, 0.3 grams of acrylic acid (AA), and 1.2 grams of hydroxyethyl acrylate (HEA) were mixed using a magnetic stir bar in a clear glass vial. The glass vial was then purged with nitrogen for 5 minutes to remove dissolved oxygen and then placed in front of a UV light (365 nanometer wavelength at approximately 1.5 mW/cm$^2$) until a coatable viscosity was achieved. A typical target for this step was an approximate viscosity of 3000 cP at room temperature.

In Example 1 of Table 3 below, a 5 gram sample of "thickened" or coatable monomer formulation (e.g, partially polymerized mixture) as described above and based on IPMHA was added to an amber vial along with 0.75 grams of REGAL-REZ 6108 tackifier, 0.0125 grams of IRGACURE 651 and 0.0083 grams of XL-330. The amber vial was then rotated overnight or until the solid ingredients were completely dissolved. The other base monomers were treated in a similar manner as shown in Table 3.

Each adhesive formulation shown in Table 3 was coated onto primed PET film at a coating thickness of 0.05 millimeters and covered with a silicone treated release liner. The PET was obtained from Mitsubishi (Greer, S.C.) under the trade designation HOSTAPHEN 3SAB. This PET is primed as received from the supplier. The release liner was obtained from Silicanature (Godega disant'Urbono, Italy). This construction was then cured using approximately 600 mJ/cm$^2$ of UV irradiation.

TABLE 3

Composition of PSA

| Example | Base Monomer of Acrylic Formulation | Coatable Acrylic Formulation (g) | R-6108 (g) | E-2520 (g) | P-1020 (g) | S-141 (g) | xl-330 (g) | I-651 (g) |
|---|---|---|---|---|---|---|---|---|
| E1 | IPMHA | 5 | 0.75 | | | | 0.0083 | 0.0125 |
| E2 | IPMHA | 5 | 0.75 | 0.5 | | | 0.0083 | 0.0125 |
| E3 | IPMHA | 5 | 0.75 | 0.5 | | 0.25 | 0.0083 | 0.0125 |
| E4 | IPMHA | 5 | 0.75 | | 0.5 | 0.25 | 0.0083 | 0.0125 |
| C1 | IOA | 5 | 0.75 | 0.5 | | | 0.0083 | 0.0125 |
| C2 | IOA | 5 | 0.75 | 0.5 | 0.25 | | 0.0083 | 0.0125 |
| C3 | IOA | 5 | 0.75 | | 0.25 | 0.5 | 0.0083 | 0.0125 |
| C4 | PHA | 5 | 0.75 | | | | 0.0083 | 0.0125 |
| C5 | PHA | 5 | 0.75 | 0.5 | | | 0.0083 | 0.0125 |
| C6 | DMOA | 5 | 0.75 | | | | 0.0083 | 0.0125 |
| C7 | DMOA | 5 | 0.75 | 0.5 | | | 0.0083 | 0.0125 |

Each sample was evaluated for peel strength and shear performance as shown in Table 4. Failure modes for peel strength were defined as follows. Adhesive failure (af) is a failure between the substrate and the PSA, leaving a clean substrate after the test. Cohesive split (cs) is a failure within the PSA material leaving adhesive on both the backing and substrate. Shocky (s) describes an erratic peel in which the force measured rapidly alternates between high and low values.

TABLE 4

Characterization of PSA

| Example | 180° Peel Strength (N/dm)/Failure Mode | | | 70° C. Shear Performance (min) |
|---|---|---|---|---|
| | Stainless Steel | PP | HDPE | |
| E1 | 23/af | 16/af | 10/af | +10,000 |
| E2 | 54/af | 59/af | 28/af | +10,000 |
| E3 | 39/af | 45/af | 27/af | +10,000 |
| E4 | 32/af | 43/af | 22/af | +10,000 |
| C1 | 99/cs | 55/cs | 70/cs | 57 |
| C2 | 96/cs | 60/cs | 58/cs | 145 |
| C3 | 84/cs | 79/cs | 79/cs | 1 |
| C4 | 10/af | 12/af | 6/af | +10,000 |
| C5 | 25/af | 20/af | 24/af | 183 |
| C6 | 12/af | 12/af | 6/af | +10,000 |
| C7 | 30/af | 23/af | 30/af | 430 |

The comparative example PSAs prepared using IOA show very high peel values on both low and high surface energy substrates. However, as shown in Table 4, these samples do not come off of the surface cleanly and all exhibit cohesive failure. The relatively low cohesive strength of these comparative PSAs is also demonstrated in their high temperature shear holding performance. In contrast, samples prepared using IPMHA have good cohesive strength and exhibit adhesive failure rather than cohesive failure.

Examples 5-6 and Comparative Examples C8-C13

Shear Holding Power of Non-Crosslinked PSAs

Bulk adhesive materials more suitable for hot-melt processed PSAs were also prepared using the following formulations and procedure. Using the relative amounts shown in Table 5, various monomers (IOA, IPMHA, PHA, and DMOA) were each separately mixed with AA, IOTG, and I-651 in an amber bottle. A portion (26 grams) of each formulation was heat-sealed within a clear polyvinyl acetate pouch is such a manner so as to eliminate any air bubbles. The pouches were prepared by heat sealing poly(ethylene vinyl acetate) film having a thickness of 0.065 millimeters that was obtained from Flint Hills Resources (Witchita, Kans.) under the trade designation VA-24. Each sealed pouch containing the monomer formulation was immersed in a constant temperature water bath at 17° C. and irradiated with ultraviolet light (365 nanometer wavelength with 4 mW/cm$^2$) for eight minutes on each side to polymerize the monomer compositions. The products were bulk polymerized elastomeric materials within the pouch material.

Pouches were then cut open and approximately 2 grams of bulk adhesive was removed. The bulk adhesive was placed between a primed (as received) PET liner (Mitsubishi) and a silicone treated release liner (Silica Nature). This construction was then placed between the plates of a CARVER (Wabash, Ind.) heated press with plate temperatures of 100° C. The construction was compressed until the adhesive layer was approximately 0.1 millimeters thick. After cooling, test samples were then cut from this construction and the silicone release layer was peeled off immediately for measurement of peel strength and shear strength as shown in Table 6.

TABLE 5

Composition of PSA

| Bulk Adhesive | IOA (g) | IPMHA (g) | PHA (g) | DMOA (g) | AA (g) | I-651 (g) | IOTG (g) |
|---|---|---|---|---|---|---|---|
| C8 | 23.4 | 0 | | | 2.6 | 0.026 | 0.0039 |
| C9 | 25.0 | 0 | | | 1.04 | 0.026 | 0.0039 |
| C10 | | | 23.4 | | 2.6 | 0.26 | 0.0039 |
| C11 | | | 25 | | 1.04 | 0.26 | 0.0039 |
| C12 | | | | 23.4 | 2.6 | 0.26 | 0.0039 |
| C13 | | | | 25 | 1.04 | 0.26 | 0.0039 |
| E5 | 0 | 23.4 | | | 2.6 | 0.026 | 0.0039 |
| E6 | 0 | 25.0 | | | 1.04 | 0.026 | 0.0039 |

TABLE 6

Characterization of PSA

| Bulk Adhesive | 180 Peel (N/dm)/failure | 25° C. Shear Performance (min) |
|---|---|---|
| C8 | 48/af | 610 |
| C9 | 66/af | 11 |
| C10 | 16/af | 1150 |
| C11 | 26/af | 24 |
| C12 | 12/af | 606 |
| C13 | 12/af | 23 |
| E5 | 10/shocky | +10,000 |
| E6 | 44/af | 467 |

Hot-melt processed acrylic PSAs often require crosslinking to impart a degree of cohesive strength and shear holding performance to the material. However, it could be advantageous to have a (meth)acrylic-based elastomeric material with a high shear strength without crosslinking. That is, the adhesive could be hot-melt processed and coated without requiring post crosslinking techniques. As shown in Table 6, elastomeric copolymers of IPMHA and AA show significantly higher shear holding performance than other $C_{10}$ alkyl (meth)acrylate formulations based on PHA and AA or DMOA and AA, or $C_8$ alkyl (meth)acrylate formulations of IOA and AA. Generally, the use of IPMHA increased shear performance by over an order of magnitude for similar AA concentrations over the comparative monomers. This increase in shear holding performance of IPMHA is thought to be due to the significantly higher storage modulus plateau of polymers prepared from polymerizable materials that include IPMHA.

What is claimed is:

1. A pressure-sensitive adhesive composition comprising an (meth)acrylic-based elastomeric material comprising a reaction product of polymerizable material comprising:
   (a) (2-isopropyl-5-methyl)hexyl (meth)acrylate in an amount in a range of 40 to 99 weight percent based on a total weight of the polymerizable material; and
   (b) a second monomer having an ethylenically unsaturated group in an amount in a range of 1 to 60 weight percent based on a total weight of the polymerizable material, wherein the second monomer comprises a polar monomer comprising (1) an acidic monomer having an acidic group and a single ethylenically unsaturated group, (2) a hydroxy-containing monomer having a hydroxyl group and a single ethylenically unsaturated group, wherein the hydroxy-containing monomer is a hydroxyalkyl (meth)acrylate or hydroxyalkyl (meth)acrylamide, (3) a nitrogen-containing monomer having a secondary amido group or a tertiary amido group or an N,N-dialkylaminoalkyl (meth)acrylate and a single ethylenically unsaturated group, or (4) a combination thereof.

2. The pressure-sensitive adhesive composition of claim 1, wherein the second monomer further comprises a non-polar (meth)acrylate ester that is not (2-isopropyl-5-methyl)hexyl (meth)acrylate, a non-polar vinyl monomer without a (meth)acryloyl group, a crosslinker with at least two ethylenically unsaturated groups, or a combination thereof.

3. The pressure-sensitive adhesive composition of claim 1, wherein the polar monomer comprises the acidic monomer.

4. The pressure-sensitive adhesive composition of claim 3, wherein the acidic group of the acidic monomer is a carboxyl group or a salt thereof.

5. The pressure-sensitive adhesive composition of claim 1, wherein the polymerizable material comprises at least 80 to 99 weight percent (2-isopropyl-5-methyl)hexyl (meth)acrylate and 1 to 20 weight percent of the second monomer based on the total weight of polymerizable material.

6. The pressure-sensitive adhesive composition of claim 1, wherein the polymerizable material comprises at least 50 to 99 weight percent (2-isopropyl-5-methyl)hexyl (meth)acrylate and 1 to 50 weight percent of the second monomer based on the total weight of polymerizable material.

7. The pressure-sensitive adhesive composition of claim 1, wherein the polar monomer is present in an amount up to 15 weight percent based on the total weight of polymerizable material.

8. The pressure-sensitive adhesive composition of claim 1, wherein the pressure-sensitive adhesive further comprises 1 to 150 parts tackifier for 100 parts (meth)acrylic-based elastomeric material.

9. An article comprising:
a pressure-sensitive adhesive composition comprising an (meth)acrylic-based elastomeric material comprising a reaction product of polymerizable material comprising
(a) (2-isopropyl-5-methyl)hexyl (meth)acrylate in an amount in a range of 40 to 99 weight percent based on a total weight of the polymerizable material; and
(b) a second monomer having an ethylenically unsaturated group in an amount in a range of 1 to 60 weight percent based on a total weight of the polymerizable material, wherein the second monomer comprises a polar monomer comprising (1) an acidic monomer having an acidic group and a single ethylenically unsaturated group, (2) a hydroxy-containing monomer having a hydroxyl group and a single ethylenically unsaturated group, wherein the hydroxy-containing monomer is a hydroxyalkyl (meth)acrylate or hydroxyalkyl (meth)acrylamide, (3) a nitrogen-containing monomer having a secondary amido group or a tertiary amido group or an N,N-dialkylaminoalkyl (meth)acrylate and a single ethylenically unsaturated group, or (4) a combination thereof; and
a substrate adhered to the pressure-sensitive adhesive composition.

10. The article of claim 9, wherein the second monomer further comprises a non-polar (meth)acrylate ester that is not (2-isopropyl-5-methyl)hexyl (meth)acrylate, a non-polar vinyl monomer without a (meth)acryloyl group, a crosslinker with at least two ethylenically unsaturated groups, or a combination thereof.

11. The article of claim 9, wherein the (meth)acrylic-based elastomeric material is crosslinked.

12. The article of claim 9, wherein the (meth)acrylic-based elastomeric material is not crosslinked.

13. The article of claim 9, wherein the pressure-sensitive adhesive composition further comprises 1 to 150 parts tackifier for 100 parts (meth)acrylic-based elastomeric material.

14. The article of claim 9, wherein the polymerizable material comprises at least 80 to 99 weight percent (2-isopropyl-5-methyl)hexyl (meth)acrylate and 1 to 20 weight percent of the second monomer based on the total weight of polymerizable material.

15. The article of claim 9, wherein the polymerizable material comprises at least 50 to 90 weight percent (2-isopropyl-5-methyl)hexyl (meth)acrylate and 1 to 50 weight percent of the second monomer based on the total weight of polymerizable material.

* * * * *